United States Patent
Maack

(10) Patent No.: US 9,530,186 B2
(45) Date of Patent: Dec. 27, 2016

(54) REAL-TIME IMAGE PROCESSING FOR OPTIMIZING SUB-IMAGES VIEWS

(71) Applicant: KONINKLIJKE PHILIPS N.V., Eindhoven (NL)

(72) Inventor: Hanns-Ingo Maack, Norderstedt (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 54 days.

(21) Appl. No.: 14/430,936

(22) PCT Filed: Sep. 23, 2013

(86) PCT No.: PCT/IB2013/058753
§ 371 (c)(1),
(2) Date: Mar. 25, 2015

(87) PCT Pub. No.: WO2014/053942
PCT Pub. Date: Apr. 10, 2014

(65) Prior Publication Data
US 2015/0254808 A1    Sep. 10, 2015

Related U.S. Application Data

(60) Provisional application No. 61/710,049, filed on Oct. 5, 2012.

(51) Int. Cl.
*G06K 9/00* (2006.01)
*G06T 3/40* (2006.01)
*G06T 5/10* (2006.01)

(52) U.S. Cl.
CPC ............. *G06T 3/4084* (2013.01); *G06T 5/10* (2013.01); *G06T 2207/10116* (2013.01); *G06T 2207/20056* (2013.01)

(58) Field of Classification Search
CPC ................ G06K 9/00; G06T 3/00; G06T 5/00
USPC ........... 382/275, 289; 345/89, 472, 660, 690
See application file for complete search history.

(56) References Cited

U.S. PATENT DOCUMENTS 5,963,676 A * 10/1999 Wu .......................... G06T 5/002
                                                              382/263
5,978,518 A * 11/1999 Oliyide ................... G06T 5/007
                                                              382/260
6,243,095 B1 * 6/2001 Shile ...................... A61B 6/463
                                                              715/854

(Continued)

FOREIGN PATENT DOCUMENTS

EP    0383269 A2    8/1990
EP    0527525 A2    2/1993

(Continued)

OTHER PUBLICATIONS

Pace et al, "A Multiresolution Approach to Image Enhancement via Histogram Shaping and Adaptive Wiener Filtering", Proc. SPIE, vol. 6978, XP002718184, Mar. 24, 2008, pp. 69780401-69780411.

*Primary Examiner* — Abolfazl Tabatabai

(57) ABSTRACT

An image processor and method for processing a sub-image (100a) specified within a global image (100). The processor (DZC) and the method yield a modified sub-image (100m) with spatial frequencies of large scale structures suppressed or removed and the modified sub-image is adapted to the dynamic grey value range of a screen (110) on which said modified sub-image (100m) is to be displayed.

13 Claims, 4 Drawing Sheets

(56) References Cited

U.S. PATENT DOCUMENTS

| | | | | |
|---|---|---|---|---|
| 6,252,931 | B1 * | 6/2001 | Aach | G06T 5/004 |
| | | | | 378/98.2 |
| 6,694,052 | B1 * | 2/2004 | Matama | H04N 1/4074 |
| | | | | 358/461 |
| 6,782,137 | B1 * | 8/2004 | Avinash | G06T 5/004 |
| | | | | 345/617 |
| 2003/0161497 | A1 | 8/2003 | Vuylsteke | |
| 2011/0043434 | A1 | 2/2011 | Roncalez | |
| 2011/0292287 | A1 | 12/2011 | Washington | |

FOREIGN PATENT DOCUMENTS

| | | |
|---|---|---|
| EP | 0712092 A1 | 5/1996 |
| EP | 0756247 A1 | 1/1997 |
| EP | 1341125 A2 | 9/2003 |
| EP | 1422662 A2 | 5/2004 |
| WO | 2007050340 A1 | 5/2007 |
| WO | 2011008239 A1 | 1/2011 |

* cited by examiner

US 9,530,186 B2

REAL-TIME IMAGE PROCESSING FOR OPTIMIZING SUB-IMAGES VIEWS

CROSS-REFERENCE TO PRIOR APPLICATIONS

This application is the U.S. National Phase application under 35 U.S.C. §371 of International Application Serial No. PCT/IB2013/058753, filed on Sep. 23, 2013, which claims the benefit of U.S. Application Ser. No. 61/710,049, filed on Oct. 5, 2012. These applications are hereby incorporated by reference herein.

FIELD OF THE INVENTION

The present invention relates to an image processor, to an image processing method, to an imaging processing system, to a computer program element, and to a computer readable medium.

BACKGROUND OF THE INVENTION

Today, an ideal X-ray viewing station is expected to present digital image data in a way comparable with X-ray films when viewed on a standardized light box. However this paradigm can only be fulfilled with expensive high resolution monitors.

SUMMARY OF THE INVENTION

There may therefore be a need for a different apparatus.

The object of the present invention is solved by the subject matter of the independent claims wherein further embodiments are incorporated in the dependent claims.

It should be noted that the following described aspects of the invention equally apply to the image processing method, to the image processing system, to the computer program element and to the computer readable medium.

According to one aspect of the present invention there is provided an image processor. The processor comprises:

an input unit for receiving sub-image information specifying a sub-image of a global image; the sub-image information including a pan information and/or a zoom scale;

a suppressor configured to suppress only in the sub-image, spatial frequency components (or bands) below a pre-defined or dynamic lower limit frequency band thereby producing a spatial frequency modified sub-image.

an output unit adapted to output for display the frequency modified sub-image at the specified zoom scale, the image processor thereby affording a zooming into the global image at an image portion thereof corresponding to the pan information. In other words, the modified image shows, when displayed on screen, the portion of the global image at the location as specified by the sub-image information. The modified sub-image is then scaled when viewed on the screen to the specified zoom scale. According to one embodiment the zoom scale is automatically set according to a display size of the available screen.

Although the DICOM standard is not supported, the apparatus allows using a low resolution screen to view for example even high pixel X-ray images and the user would still be able to discern local image details. The apparatus spatial frequency suppressor suppresses low frequency (measured in "line pairs" per mm or "cycles" per mm across the image plane) components that would only add a gradient to the image caused by a large scale image structure.

In one embodiment, the image is split into a number of band images following a Laplace decomposition, each band image having only spatial frequencies in a respective frequency band. Within this image pyramid, the bands with increasing index number represent larger and larger structures. Some of the higher bands, that is, only those spatial frequencies (bands) below that lower frequency limit, are reduced or suppressed if it is not the full (global) image that is to be displayed but only the specified spatial sub-image of said full image. If the global image is for examples 3000 pixel-wide and the zoom-and-pan adjustment selects only a 300 pixel-wide spatial section of the global image as the sub-image, there will be no significant contribution in the image from the lower bands so no significant "local" detail is lost and the remaining higher frequencies are better discernible by the viewer because gradients from large scale structures are removed or suppressed. So both, sub-image and the frequency modified sub-image are spatial sections of the global image, but in the frequency modified sub-image low spatial frequencies are suppressed as compared to the spatial frequency spectrum of the unprocessed sub-image. This effects an improved workflow when reading large X-ray images at a diagnostic workstation even when a low cost monitor/screen is used.

Suppression as used herein is understood to include the case where a band is completely eliminated (suppression factor=0). A suppression proper occurs when the respective suppression factor/weight is less than unity. No suppression occurs when the factor is unity.

The pan-information specifies where in the global image the sub-image is located. So the specified sub-image is a spatial sub-area or part of the global image plane. For rectangular sub-images, this would include for example the upper left hand corner and the length and width of the rectangle in pixel units of the global image. However other sub-image shapes requiring different pan specifications are also contemplated. The zoom information specifies the scale at which the frequency modified sub-image is to be displayed on screen. The zoom information or scale factor may be received at the same time as the pan information or at a later stage when the frequency modified sub-image is readied for output on the screen. The zoom information is related to the monitor's matrix size. The zoom information is either directly user-defined by the user demarking for instance with the pointer tool in a second (other than the pointer tool user action for defining the sub-image size) user action an on-screen window in which the image is to be displayed. In another embodiment the zoom information is derived from a previously (user-)selected zoom factor by dividing the matrix size of the output window (in which the zoomed image is to be displayed) of the display monitor by this zoom factor. In this embodiment, no second pointer tool action in relation to the zoom factor is required.

According to one embodiment, the input unit comprises a graphical user interface responsive to a user operated input means, in particular a pointer tool such as a computer mouse. The sub-image information is received as the pointer tool is operated by the user, for example by click and drag action.

According to one embodiment, the frequency modified sub-image is produced by the suppressor upon the input unit receiving the sub-image information. In other words, the computation for obtaining the modified image can be done in real-time, that is, upon the user requesting same. The real-time user experience can be achieved in part because the computation for the suppression action is restricted to the image information in the specified sub-image region.

According to one embodiment, the processor is configured to produce an updated frequency modified sub-image upon the input unit receiving updated sub-image information. The image processor is thereby capable of outputting a sequence of updated frequency modified sub-images whilst a sequence of updated sub-images is being received at the input unit. In other words, the real time computation capability of the apparatus allows updating the modified image as the user requests to zoom into the global image at different image portions defined by different sub-images.

According to one embodiment, the apparatus further comprises an image generator configured to control a screen, the screen when so controlled displaying the frequency modified sub-image on the screen either along with or instead the global image.

According to one embodiment, the processor is configured to produce a difference image between the sub-image and frequency modified sub-image, the image generator configured to control the screen so as to display the difference image along with the frequency modified image, the difference image having only the suppressed spatial frequencies. So together with the modified sub-image there is also a control image is optionally shown. This control image may be displayed at any size, either as the currently displayed modified image or preferably as a small "stamp image" to provide to the user the complementary information not shown in the currently viewed larger spatial frequency modified image.

According to one embodiment, the lower frequency limit is indicative of a frequency band in a Laplace image pyramid decomposition of the global image. In other embodiments a Fourier decomposition or a Wavelet decomposition may be used. A combination of (a bank) of high and low pass filters may be used for effecting the decomposition or analysis. The decomposition may be done once up-front in a preparatory step upon invoking the global image but previous to when the user specifies the sub-image and is only updated once the user loads a new global image. This processing order enhances yet further the real-time experience for the user when changing from one sub-image to another. In another embodiment however, the decomposition is done once the user has specified the sub-image information. It is understood herein that for present purposes any spatial frequency analysis may be used to obtain the various spatial frequency bands, which can then be arranged in ascending or descending order in a hierarchy.

According to one embodiment, the frequency threshold or lower frequency limit is dynamic because it varies with a size of the sub-image as specified in the received information and embodiment. More specifically, the lower frequency limit is the higher the smaller the sub-image size. So in relatively small sub-images more bands are suppressed than in relatively large sub-images with the lower frequency limit approaching null as the sub-image approaches the global image size, so no bands are suppressed in this limit case and the sub-image is identical to the global image.

According to one embodiment, an amount of the suppression is dynamically adapted so varies with the frequency bands. More specifically, the amount of suppression is higher the lower any given frequency band is below the lower frequency limit. In other words, the apparatus affords the functionality of adaptively adjusting which frequencies are to be suppressed with the suppression being more pronounced the lower the frequency is relative to the lower limit frequency below which suppression is to occur. In one embodiment, the apparatus can also be adjusted so that there is a specific cut-off frequency below which the frequency bands are switched off no matter by how much the bands are below the lower frequency limit.

Arranging the frequency bands in a hierarchical data structure according to the frequencies allows a simple implementation of the above suppression algorithm because the relevant frequencies bands can be addressed by a simple integer index which at the same time indicates the high or lowness of the frequencies within the total spatial frequency spectrum.

According to one embodiment, the output unit is configured to map the dynamic grey value pixel range of the spatial frequency modified sub-image to a contrast range capability of a screen on which the spatial frequency modified sub-image is to be displayed: The mapping, for example an at least piece-wise linear contrast stretch, can be constructed by using a suitably binned brightness histogram of the spatial frequency modified sub-image. The contrast of grey value range is defined by the difference between the smallest and largest pixel grey value.

In other words, the specified part of the image (either the full image, or the sub-image at a location as defined by the current "pan" and "zoom" adjustments) is processed so as to always fit into the grey value range of the monitor. The image contrast is always optimized, even the monitor has limited grey-value resolutions. Furthermore, there is no more need for interactive contrast and brightness control.

The modified sub-image can be displayed on the screen at a higher contrast than the original sub-image where lower frequencies are not suppressed. Because of the suppression of low frequencies, large scale structures are essentially eliminated from the image and need therefore not be accounted for when mapping the modified image to the monitor's grey value range. Because now fewer (that is, only the local, small scale structures remain) image structures are mapped or "stretched" out across the whole monitor grey value range, the grey value transitions representative of those fewer structures are less gradual or more "abrupt" so a higher contrast can be achieved. In other words, portions in the image having the highest brightness values across the sub-image are mapped to image values at one end of the monitor's dynamic grey value scale, that is, are mapped to highest grey value ("white"), and the portions having the lowest brightness values across the sub-image are mapped to the lowest grey value ("black") at the other or opposite end of the scale or vice versa, with white and black inverted. An off-the-shelf HDTV monitor may be sufficient to still have a high contrast viewing experience of local image details. Computations for the grey value range adaption are restricted to the pixel information in the modified sub-image which affords yet a better real-time experience for the user. The monitor specific grey value range adaptation is repeated for each new modified sub-image thereby ensuring at all times a contrast optimized view of the image should the user update the sub-image information. It is understood that a similar mapping can be used for color images when mapped to the monitor's color range.

BRIEF DESCRIPTION OF THE DRAWINGS

Exemplary embodiments of the invention will now be described with reference to the following drawings wherein.

DETAILED DESCRIPTION OF EMBODIMENTS

Figure 1:
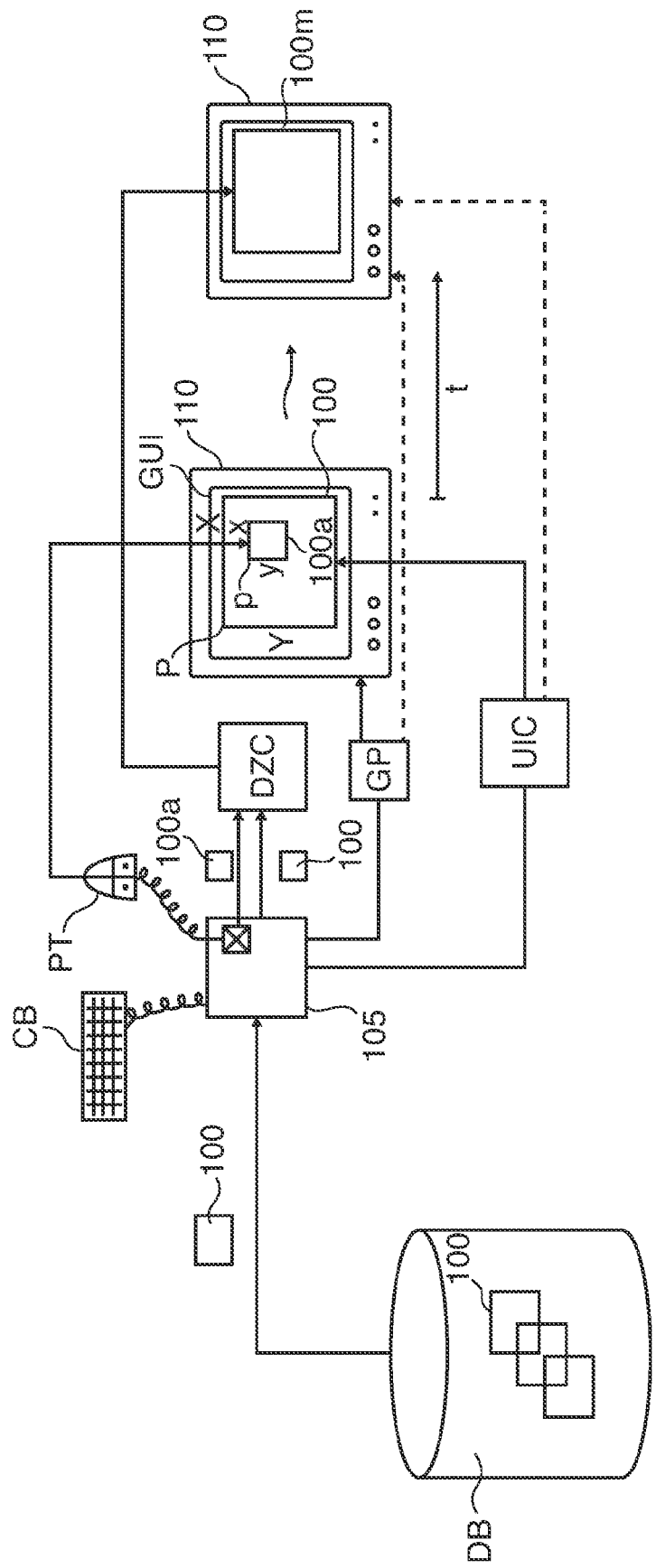
FIG. 1 is a schematic block diagram of an image processing system.

With reference to FIG. 1 there is shown an image processing system.

The system comprises a database DB on which acquired images are stored. The images may for example be x-ray images stored in digital form but it is understood that the apparatus as described herein may be equally applied to other than medical images. There is a work station 105 or a computer unit arranged for a user, say clinical personnel, to retrieve image 100 from database DB. Data base DB and work station 105 are assumed to be connected in a suitable communication network as known heretofore. Work station 105 has user input means or tools such a keyboard CB and/or a pointer tool PT, such as an electronic stylus or a computer mouse, for interaction of the user with the retrieved image 100. A graphic chip (graphics or video card) GP controls display of said image on a screen 110. Work station 105 runs suitable viewer software which may include a user interface controller UIC generally configured to generate for display on screen 110 a graphical user interface GUI. Retrieved image 100 can then be viewed inside the graphical user interface GUI and user can then manipulate same in a manner which will be explained in more detail below.

The system includes an image processor DZC ("dynamic zoom view controller") which affords to the user a dynamic zoom functionality. X-ray image 100 may initially be viewed on screen 100 in its entirety or in at least in relatively large parts as a "global image" having pixel widths and lengths X,Y which can be in the region of three by five thousand pixels for x-ray images when acquired with current image scanners. The overall position of initial image 100 on screen 110 is specified by the position of its upper left hand corner P relative to a screen coordinate system. The user may then use the pointer tool PT, for example a computer mouse, to specify by click-and-drag action a sub image 100a, that is a part or section of displayed image 100, if user wishes to view an enlarged view of global image 100 at the area defined by said sub-image 100a. This "zooming into" the global initial image 100 at the specified image part 100a may be initiated by movement of pointer tool PT. A driver (not shown) of system 100 is arranged by using suitable event-driven programming techniques to listen to mouse click and mouse movement events and to thereby capture in-image coordinate information indicative of the size and position of sub-image 100a which the user requested to be viewed in zoom view. In other words, the system via its pointer tool affords to the user a pan and zoom functionality. User clicks on any desired position on the displayed global image 100 thereby specifying the left-upper corner p of sub-image 100a. User then drags open a rectangle having width and length x,y thereby defining spatial dimensions of sub-image 100a. The sub-image size x,y is then forward to dynamic zoom view controller DZC.

Controller DZC supports an enlarged view of the sub image 100a on screen 110 by ensuring that local image details in the specified sub image are displayed at better contrast even on an average quality screen 110a. Local details are emphasized, that is those within the perimeter of the specified sub-image 100a, and are then rendered for view on screen in a modified sub-image 100m at higher contrast than the contrast in the global image at the portion specified by sub-image 100a. Details that would normally not be shown in low contrast screen 110 can then be discerned and differentiated by the user. Medical image based diagnosis becomes possible with even a low-cost off-the shelf monitor that can be purchased at any electronics discounter.

Based on sub-image size specifications x,y provided by the user via pointer tool PT, controller DZC then computes the modified sub-image 100m which is then displayed on screen 110. Dynamic zoom controller DZC is dynamic in the sense that the modified image 100m is computed in real-time that is upon receiving sub-image information p,x,y and is re-computed upon receiving updated sub-image information as the viewer is moving about pointer tool PT to specify not only one but possibly a sequence or series of sub-images.

Broadly speaking controller DZC suppresses low spatial frequency components or bands in the image that are lower than a dynamically adapted spatial frequency limit. According to one embodiment computation of the frequency spatial frequency modified image 100m is executed in real time. This is made possible partly because the computations performed during operation of dynamic zoom view controller DZC are restricted to the image portion defined by the sub image information p,x,y. It is only at the locale of the sub-image 100a that the spatial low frequency components are suppressed. According to one embodiment the controller DZC is configured to adapt the grey value dynamic range of the frequency modified image 100m to fit the dynamic grey value range of monitor 110 to be used for display of frequency modified image 100m.

Figure 2:
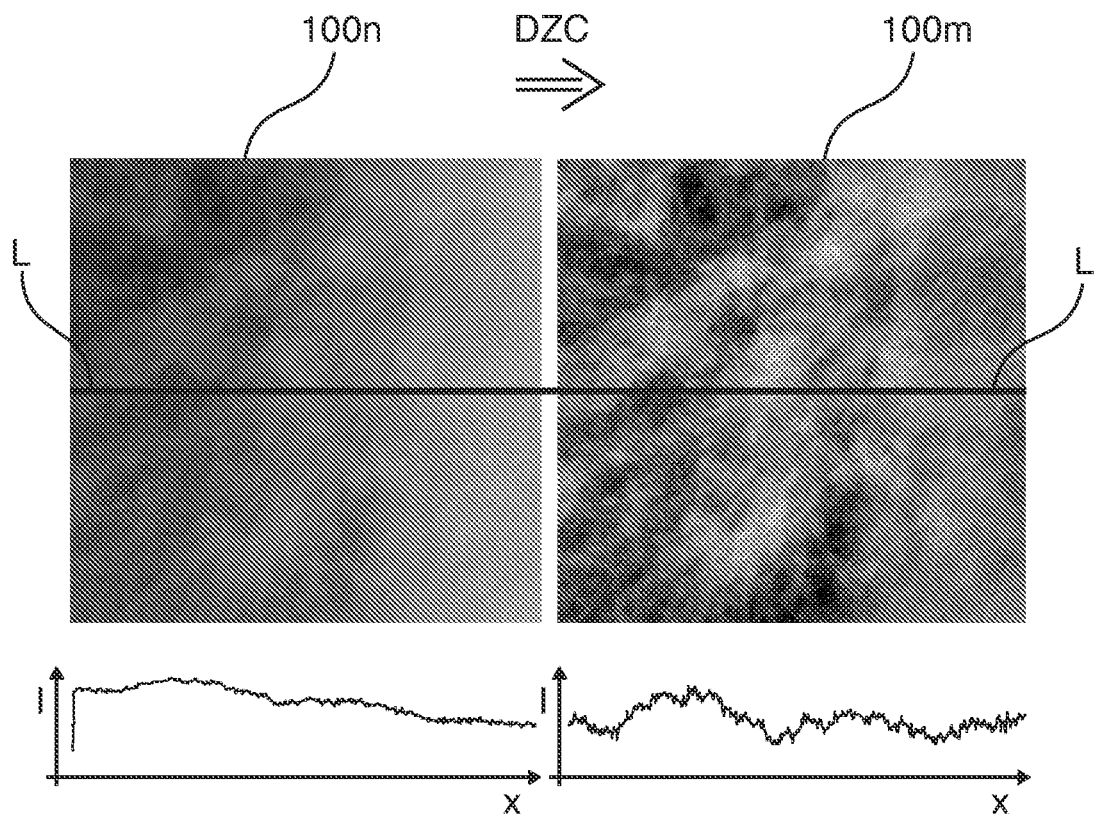
FIG. 2 is a schematic view of a sub-image and a spatial frequency modified sub-image.

To better explain operation of the dynamic zoom controller DZC reference is now made to FIG. 2 which shows the result of applying dynamic zoom controller DZC to the sub-image 100a. Left pane of FIG. 2 shows sub-image 100a before application of controller DZC and right pane shown the frequency modified sub-image 100m as the result of said application.

Sub-image 100a is spatial section of global image 100 and includes small scale structures and large scale structures, the later only relevant when one wishes to view the whole of global image 100. The graph below each of the sub-images 100a, 100m are the respective pixel intensity profiles I taken at line L along the x-axis of each sub-image 100a, 100m.

The presence of large structures in sub-image 100a is evident by the gradual slope from the left to the right in x-direction. This sloping is due to a gradient caused by large scale structure information in unprocessed sub-image 100a. The local small scale structures are the fine modulations superimposed on said gradient. Because the presence of the large scale structure takes up a large part of the dynamic grey value range, the pixel intensities within pixel portions representing the small scale structures are less pronounced, in other words, small sale structures are shown at a relatively low contrast.

On the other hand, in the frequency modified sub-image 100m whose range has been adapted to the monitor's grey value dynamic range, the small scale structures are shown at a higher contrast in the right pane. As can be seen from the profile curve of frequency modified sub-image 100m, there is no more sloping of the profile curve because the spatial frequencies of the background large scale structure has been removed. Pixel values representative of small scale structures can now be stretched across the whole grey value range and therefore the frequency modified sub-image 100m can be displayed at higher contrast than in unprocessed sub-image.

It is proposed herein that controller DZC suppresses only the spatial frequency of large scale structures but the higher spatial frequencies of the small scale structures remain in the image. Additionally, before display of same, the grey values of frequency modified sub-image 100m are adapted to the grey value range of the monitor.

Operation

Figure 3:
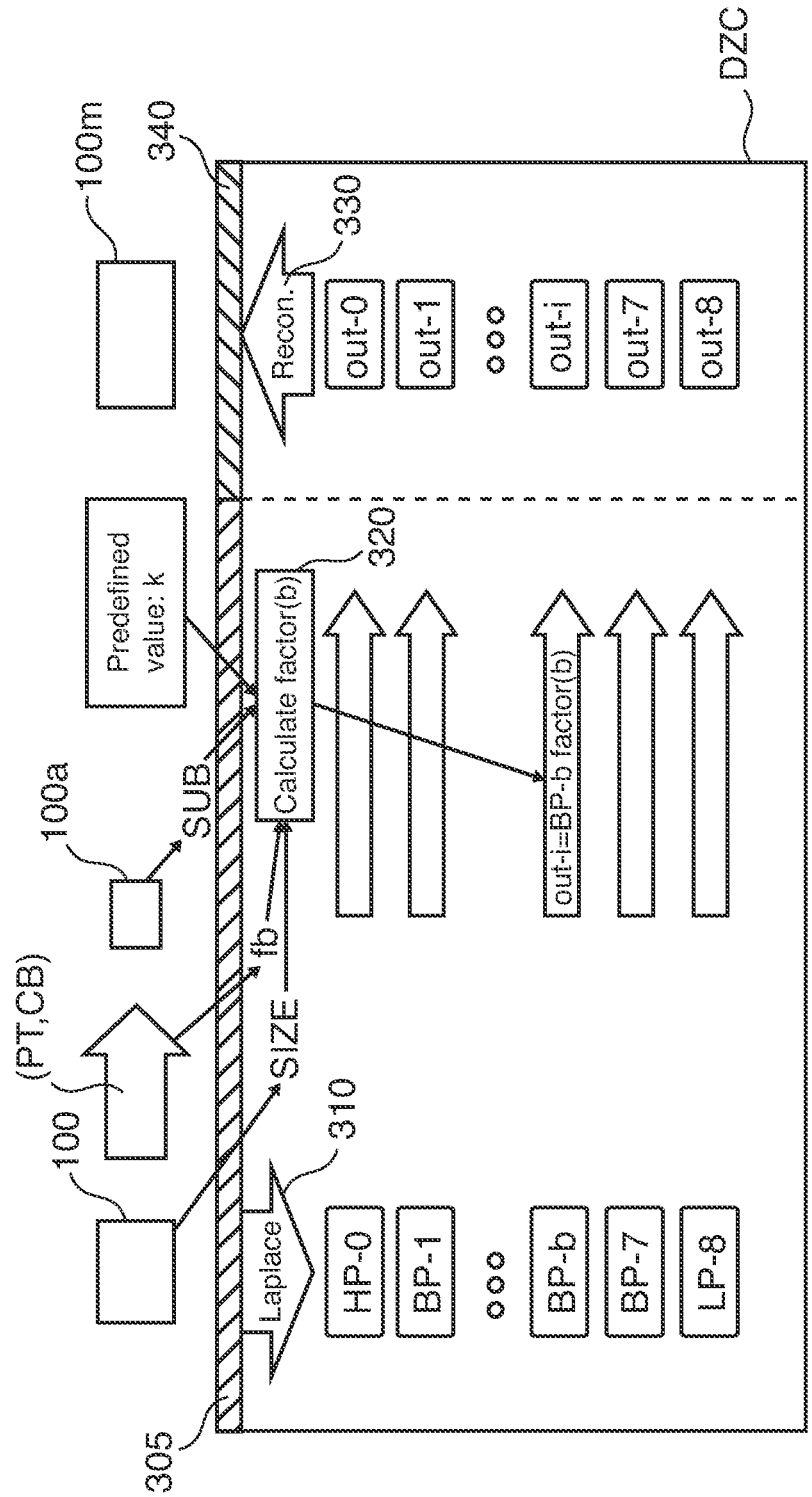
FIG. 3 is a block diagram of an image processor used in a system as of FIG. 1.

Operation of dynamic zoom controller DZC is now explained in more detail with reference to FIG. 3. Global image 100 is received at input interface 305 of controller DZC. As explained above, sub-image 100a information is provided by the user through keyboard CB strokes or by movement and/or click actions of pointer tool PT and is also received at controller DZC via the same input interface 305 or a different interface.

Image analyzer 310 analyzes or decomposes global image 100 into its spatial frequency bands from which the image information in said image 100 can be thought to be built up. This spatial spectral analysis is done in one embodiment by executing the iterative Laplace Pyramid algorithm as described in U.S. Pat. No. 6,252,931. The different spatial frequency bands so generated are then arranged in a suitable data structure such as an associate array as shown in FIG. 3. The bands are ordered in a "pyramid" according to the their frequencies with HP ("high pass")-0 indicating the highest frequency band, the tip of the pyramid as it were, gradually decreasing via frequency bands BP-b (b=1 . . . 7) down to the lowest frequency LP ("low pass")-8. Each frequency component in a given band is lower than any frequency component in a band above said given band. In the example shown in FIG. 3, there are nine frequency bands (each band comprising a range of frequency components) from which the image 100 is formed as a superposition of those frequencies each taking at respective amplitudes. Each spatial frequency band is addressable by an integer index b. A higher index b indicates a lower frequency so by incrementing spatial frequency index b the system can progressively visit lower and lower spatial frequency components.

Suppressor 320 then computes based on i) the size SUB of sub-image 100a, ii) the size SIZE of global image 100, iii) an (optional) use-definable frequency parameter fp and iv) a pre-defined constant K, a suppression factor(b) for each band which can then be applied to the frequency bands when building-up the (spatial) frequency modified sub-image 100b. The suppressed frequencies in each of the suppressed bands are then output as shown on the right of FIG. 3 as blocks out-0 through out-8.

Depending on the input to suppressor 120, and in particular on the ratio between the SUB and SIZE, a lower frequency limit can be established such that the suppression factors for frequency bands below said limit vary between less than 1 and zero whereas suppression factors for bands above said limit are approximately unity. In other words frequencies higher than said limit are preserved whereas frequencies below said limit are suppressed or even completely annihilated of eliminated when the factor is computed to be zero or less than a negligible "cut-off" value ϵ.

The lower frequency limit is dynamic because it depends on the changing image size ratio which is turn depends on the size of sub-image 100a as chosen by the user. In addition and according to one embodiment, frequencies below said limit are suppressed the stronger the lower the frequency band is situated below said limit. The suppression delivered by suppressor has therefore a dual dependency on i) image ratio which in turn determines the lower frequency limit and ii) where the spatial frequency band is in the spatial frequency spectrum relative to the lower frequency limit.

Image reconstructor or synthesizer 330 then reconstructs the modified sub-image 100m by using pixel information from sub-image 100a and by applying to its original spatial frequency spectrum the computed suppression factors to output spatial frequency modified image 100m for display on screen 110. Spatial frequency modified image 100m is forwarded by a suitable output interface means 340 to the graphics chip GP which then renders the image information therein into the frequency modified image 100m for display on screen 110.

In one embodiment, prior to output on screen 110, a screen adaptor module which may be implemented in output means 340 or graphic chip GP is configured to adapt the dynamic range of brightness grey values in the modified image 100m to the actual dynamic grey scale capability of monitor 110 to be used for display of said image. The system thereby affords screen adaptive viewing of the modified image so the user can better discern structural differences at the locale in global image as specified by sub-image 100a. To this effect a brightness histogram of the modified image 100m is computed with each bin ("window") recording the proportion or number of pixels at a particular brightness or grey scale value. The minimum and maximum brightness pixels in image 100m as revealed by the histogram are then mapped respectively to the minimum and maximum grey values of the computer screen gray value range with grey values in between the two extremes being suitably rebinned, the image 100m histogram thereby stretched to fit the grey value palette of screen 110.

In contrast stretch techniques, the 0%- and 100%-percentiles of sub-image 100m are mapped according to one embodiment by way of a piecewise linear function to min and max brightness or grey values which the screen 110 (driven by graphic chip GP) is capable of displaying. In one embodiment, the pixel values in the frequency modified sub-image 100m are changed or the look-up table used by the graphic chip GP is changed. According to one embodiment, the output scale mapping is median preserving. In other words, the mapping is chosen such that the median (or 50%-percentile) of pixel values in the modified sub-image 100m is mapped to approximately the same monitor grey value as the median of the original sub-image 100a. This may imply that it is only one end of the image 100m's grey value range that is mapped to respective ones of the monitor's MAX or MIN grey value, but not both ends. For example, when preserving the median, either the 1% percentile in the image 100m's dynamic range is mapped to the 5% percentile MIN monitor grey values or the 99%-percentile of the image 100m's dynamic range is mapped to the 95% MAX of the output brightness.

This contrast stretched image is then displayed as the modified image 100m on screen 110. It is understood that the image output interface means 340 can retrieve the necessary data on the monitor's grey value range from either the graphics card or by directly interfacing with screen 110 or via manual user setting functionalities. The latter allows the user to manually supply to controller DZC the dynamic grey value range specification of the screen to be used. This information can be updated should a new monitor be used for display to ensure best contrast view of modified image based on the monitor actually used. In one embodiment it is the output interface means (340) where the scaling according to the user specified zoom information is applied to the frequency modified and dynamic range adapted sub-image 100m.

Operation of suppressor 320 is now explained in more detail with reference to the following pseudo code listing showing functions and definitions used in computing the suppression factors:

| | | |
|---|---|---|
| (1) | Global image size: | SIZE |
| (2) | sub-image size | SUB |
| (3) | Band number b | b = 0 for highest frequency (at full resolution) |
| | | b = 1 for next band (at half the resolution) |
| (4) | Last Band bmax | bmax is the end of the pyramid, containing the LowPass indexed by largest index (b = 9) |
| (5) | frequency parameter fp | fp controls boundary between high and low frequency bands |
| | | fp = 0 →spb always 0 so no image modification |
| | | fp = 1 →highest effect of image modification |
| | | fp is intended to be a user parameter |
| (5a) | | $\Delta b$ = bmax-b the higher $\Delta b$, the higher the spatial frequency |
| (6) | scale parameter of band clipped scale parameter Das ist jetzt OK | spb0 = (fp*SIZE*$2^{-(\Delta b = bmax-b)}$/SUB) - 1 |
| | | spb = {IF spb0 > 0 THEN spb = spb0 ELSE spb = 0} |
| (7) | Laplace band | Lb |
| (8) | Adjustment parameter | k = [1 = no adjustment; 1.1, . . . ;] |
| | | k = 1 switches everything off |
| | | k = 999 switches all too-large-bands (where $\Delta b$ is relatively small) completely off |
| | | k = 2 . . . 4 weakens the lower bands in a smoother way |
| (9) | Band suppression factor | factor(b) = $k^{-sp(b)}$ |
| (10) | Dynamic range zoom adjustment: | $Lb^{zoom}$ = Lb * factor(b) |
| (11) | Displayed image: | image_out = sum of all $Lb^{zoom}$ |

In one embodiment, and as can be seen in above at (9) the band suppression factor or band reduction factor decays exponentially with $\Delta b$ so the amount of suppression (which varies between nil and unity) varies exponentially with $\Delta b$. Exponent variable $\Delta b$ measures the distance to the lowest band bmax in terms of band index b with $\Delta b$=0 indicating the lowest band, that is the lowpass of the image and $\Delta b$=1, 2 . . . indicating in turn the higher frequency bands.

According to above algorithm and as can be seen in line (9) the rate of decay, that is the amount of suppression, can be controlled by choosing the exponential base k. accordingly. The best value for exponential base k in the circumstances can be established by conducting trails for various values and polling medical practitioners on what they believe the visually most useful image results are. Values that proved useful are k=1.5 or 2.

A very large value of k (for example k=999) would lead to result that on the average very low frequency bands are completely switched off that is the factor is approximately naught. In yet other words, the suppression for very large k values are no longer differentiated and a blanket suppression of zero is applied to all bands below the lower limit frequency. In contrast, the dependence of suppression on the frequency is afforded when k is chosen larger than 1 but small for example k=1.5 or 2 with the frequency dependence of the suppression gradually vanishing with larger k.

According to one embodiment, computation of scale parameter sp(b) (that is, the exponent of k) is as shown in line (6). The ratio SUB/SIZE is compared with $2^{-\Delta b}$. If the sub-image to global image ratio is larger than $2^{-\Delta b}$ at a certain band b, a scale parameter of 0 is returned and no suppression is applied to that at band b and bands higher than said b. For bands lower than b where the image ratio is less than $2^{-\Delta b}$, a suppression factor less than 1 results. In this manner, the lower frequency limit or cut-off frequency is defined. The lower limit frequency demarks the band between suppressed and non-suppressed bands can therefore be seen to depend on the sub-image to global image ratio and the amount of suppression (for a small (<2), given k) depends on the "lowness" of the spatial frequency band, that is, the position of the band in the Laplace pyramid hierarchy as measured by the index distance $\Delta b$. In other words, the lower the bands position b (that is the smaller $\Delta b$) in the frequency band pyramid, the higher or stronger said band is suppressed by suppressor 320. The user adjustable factor fp allows shifting the lower frequency limit up and down the pyramid. It is understood that the hierarchy may also be reversed with index $\Delta b$=0 indicating the highest frequency in which the above formulae are understood to be adapted by an index transformation.

The suppression factors $Lb^{zoom}$ once calculated are then applied respectively to each of the frequency bands Lb. Spatial frequencies in the respective bands have their amplitude dampened at (10) by suppression factor as calculated at (9). The frequency modified image 100*m* is then output as a superposition at (11) of the suppressed and non-suppressed spatial frequencies.

The following tables 1-4 show examples for suppression factors in dependence of the image size ratio and spatial frequency index b, and fp.

TABLE 1

| Parameter | | | | | | | | | |
|---|---|---|---|---|---|---|---|---|---|
| Bmax-b | | Bmax-b | | Bmax-b | | Bmax-b | | Bmax-b | |
| SIZE | 5000 | SIZE | 5000 | SIZE | 5000 | SIZE | 5000 | SIZE | 5000 |
| SUB | 158 | SUB | 4000 | SUB | 1000 | SUB | 256 | SUB | 256 |
| fb | 1 | fb | 1 | fb | 1 | fb | 1 | fb | 1 |
| k | 2 | k | 1.5 | k | 1.5 | k | 1.5 | k | 999 |
| spb | | | | | | | | | |

TABLE 1-continued

| | | | | | Parameter | | | | | | |
|---|---|---|---|---|---|---|---|---|---|---|---|
| b | spb' | factor(b) | b | spb | factor(b) | spb | factor(b) | spb | factor(b) | spb | factor(b) |
| 0 | 0.00 | 1.000 | 0 | 0.000 | 1.00 | 0.000 | 1.00 | 0.000 | 1.00 | 0.000 | 1.00 |
| 1 | 0.00 | 1.000 | 1 | 0.000 | 1.00 | 0.000 | 1.00 | 0.000 | 1.00 | 0.000 | 1.00 |
| 2 | 0.00 | 1.000 | 2 | 0.000 | 1.00 | 0.000 | 1.00 | 0.000 | 1.00 | 0.000 | 1.00 |
| 3 | 0.00 | 1.000 | 3 | 0.000 | 1.00 | 0.000 | 1.00 | 0.000 | 1.00 | 0.000 | 1.00 |
| 4 | 0.00 | 1.000 | 4 | 0.000 | 1.00 | 0.000 | 1.00 | 0.000 | 1.00 | 0.000 | 1.00 |
| 5 | 0.00 | 1.000 | 5 | 0.000 | 1.00 | 0.000 | 1.00 | 0.000 | 1.00 | 0.000 | 1.00 |
| 6 | 0.00 | 1.000 | 6 | 0.000 | 1.00 | 0.000 | 1.00 | 0.000 | 1.00 | 0.000 | 1.00 |
| 7 | 0.98 | 0.508 | 7 | 0.000 | 1.00 | 0.000 | 1.00 | 0.221 | 0.91 | 0.221 | 0.22 |
| 8 | 2.96 | 0.129 | 8 | 0.000 | 1.00 | 0.000 | 1.00 | 1.441 | 0.56 | 1.441 | 0.00 |
| 9 | 6.91 | 0.008 | 9 | 0.000 | 1.00 | 0.250 | 0.90 | 3.883 | 0.21 | 3.883 | 0.00 |
| 10 | 14.82 | 0.000 | 10 | 0.000 | 1.00 | 1.500 | 0.54 | 8.766 | 0.03 | 8.766 | 0.00 |
| 11 | 30.65 | 0.000 | 11 | 0.250 | 0.90 | 4.000 | 0.20 | 18.531 | 0.00 | 18.531 | 0.00 |

Above table 1 shows the direct relationship between the sub image size and the number of suppressed frequency bands as one moves through the columns from left to right. In the first column scenario, sub-image SUB has nearly the size of global image so there is a 10% suppression at the lowest frequency band so about 90% of the band is used in the modified sub-image 100m. The lower limit frequency shifts upwards as one moves to smaller and smaller sub images, for example in the next to rightmost column, where SUB is a mere 256 pixel versus the 5000 pixel global image. Because the sub-image relatively small, the last four frequency bands 8-11 are completely switched off or eliminated and the seventh band is still substantially suppressed at about 91% so the use of this band in the spatial frequency modified image 100m is reduced to 91%. So in this case of a relatively small sub-image, it is nearly 50% of the bands than are affected by the suppression action.

The last column shows the effect of choosing base k very large, for instance k=999. Low frequency bands are completely eliminated not matter how much their frequency band is below the lower frequency limit.

The following table 2 shows the effect of the user adjustable frequency parameter fp. As can be seen when progressing from left to right column, the action of the suppression is shifted effectively down by one band as one halves the frequency parameter fp.

TABLE 2

| | | Parameter | | |
|---|---|---|---|---|
| Bmax-b | | | | |
| SIZE | 5000 | 5000 | 5000 | 5000 |
| SUB | 256 | 256 | 256 | 256 |

TABLE 2-continued

| | | Parameter | | |
|---|---|---|---|---|
| fb | 1 | 0.5 | 0.25 | 0.125 |
| k | 2 | 2 | 2 | 2 |
| spb | | | | |
| b | spb | factor(b) | factor(b) | factor(b) | factor(b) |
| 0 | 0.00 | 1.000 | 1.000 | 1.000 | 1.000 |
| 1 | 0.00 | 1.000 | 1.000 | 1.000 | 1.000 |
| 2 | 0.00 | 1.000 | 1.000 | 1.000 | 1.000 |
| 3 | 0.00 | 1.000 | 1.000 | 1.000 | 1.000 |
| 4 | 0.00 | 1.000 | 1.000 | 1.000 | 1.000 |
| 5 | 0.00 | 1.000 | 1.000 | 1.000 | 1.000 |
| 6 | 0.00 | 1.000 | 1.000 | 1.000 | 1.000 |
| 7 | 0.22 | 0.858 | 1.000 | 1.000 | 1.000 |
| 8 | 1.44 | 0.368 | 0.858 | 1.000 | 1.000 |
| 9 | 3.88 | 0.068 | 0.368 | 0.858 | 1.000 |
| 10 | 8.77 | 0.002 | 0.068 | 0.368 | 0.858 |
| 11 | 18.53 | 0.000 | 0.002 | 0.068 | 0.368 |

As can be seen in the following table 3 the interplay between K and the number of suppressed frequency bands are shown. Lower frequency bands are switched of (that is, suppression factor is naught) as exponential base k is growing. Because parameter K acts highly non-linear it is proposed in one embodiment to keep parameter k fixed and not user adjustable.

TABLE 3

| | | | | Parameter | | | | | |
|---|---|---|---|---|---|---|---|---|---|
| Bmax-b | | | | | | | | | |
| SIZE | 5000 | 5000 | 5000 | 5000 | 5000 | 5000 | 5000 | 5000 | 5000 |
| SUB | 256 | 256 | 256 | 256 | 256 | 256 | 256 | 256 | 256 |
| fb | 1 | 1 | 1 | 1 | 1 | 1 | 1 | 1 | 1 |
| k | 1 | 1.2 | 1.5 | 2 | 2 | 4 | 10 | 100 | 1000 |
| spb | | | | | | | | | |
| b | spb' | factor(b) | factor(b) | factor(b) | factor(b) | factor(b) | factor(b) | factor(b) | factor(b) | factor(b) |
| 0 | 0.00 | 1.000 | 1.000 | 1.000 | 1.000 | 1.000 | 1.000 | 1.000 | 1.000 | 1.000 |
| 1 | 0.00 | 1.000 | 1.000 | 1.000 | 1.000 | 1.000 | 1.000 | 1.000 | 1.000 | 1.000 |
| 2 | 0.00 | 1.000 | 1.000 | 1.000 | 1.000 | 1.000 | 1.000 | 1.000 | 1.000 | 1.000 |

TABLE 3-continued

| | | | | | Parameter | | | | | |
|---|---|---|---|---|---|---|---|---|---|---|
| 3 | 0.00 | 1.000 | 1.000 | 1.000 | 1.000 | 1.000 | 1.000 | 1.000 | 1.000 | 1.000 |
| 4 | 0.00 | 1.000 | 1.000 | 1.000 | 1.000 | 1.000 | 1.000 | 1.000 | 1.000 | 1.000 |
| 5 | 0.00 | 1.000 | 1.000 | 1.000 | 1.000 | 1.000 | 1.000 | 1.000 | 1.000 | 1.000 |
| 6 | 0.00 | 1.000 | 1.000 | 1.000 | 1.000 | 1.000 | 1.000 | 1.000 | 1.000 | 1.000 |
| 7 | 0.22 | 1.000 | 0.961 | 0.914 | 0.858 | 0.858 | 0.736 | 0.602 | 0.362 | 0.218 |
| 8 | 1.44 | 1.000 | 0.769 | 0.557 | 0.368 | 0.368 | 0.136 | 0.036 | 0.001 | 0.000 |
| 9 | 3.88 | 1.000 | 0.493 | 0.207 | 0.068 | 0.068 | 0.005 | 0.000 | 0.000 | 0.000 |
| 10 | 8.77 | 1.000 | 0.202 | 0.029 | 0.002 | 0.002 | 0.000 | 0.000 | 0.000 | 0.000 |
| 11 | 18.53 | 1.000 | 0.034 | 0.001 | 0.000 | 0.000 | 0.000 | 0.000 | 0.000 | 0.000 |

In the following table 4, the size of sub image is halved in turn as one moves from left to right through the columns. In the first columns there is no suppression (factors are all unity) because sub-image size equals global image size. As the sub-image is halved an the image size ratio becomes smaller, more and more bands are suppressed and/or switched off. In the last column, six bands are suppressed and bands 10-11 even completely switched off as the sub-image is shrunk to a 132 pixel size versus the 5000 pixel global image size.

TABLE 4

| | | | Parameter | | | |
|---|---|---|---|---|---|---|
| | Bmax-b | | | | | |
| SIZE | 5000 | 5000 | 5000 | 5000 | 5000 | 5000 |
| SUB | 5000 | 2500 | 1250 | 635 | 317 | 158 |
| fb | 1 | 1 | 1 | 1 | 1 | 1 |
| k | 2 | 2 | 2 | 2 | 2 | 2 |
| spb | | | | | | |
| b | spb | factor(b) | factor(b) | factor(b) | factor(b) | factor(b) | factor(b) |
| 0 | 0.00 | 1.000 | 1.000 | 1.000 | 1.000 | 1.000 | 1.000 |
| 1 | 0.00 | 1.000 | 1.000 | 1.000 | 1.000 | 1.000 | 1.000 |
| 2 | 0.00 | 1.000 | 1.000 | 1.000 | 1.000 | 1.000 | 1.000 |
| 3 | 0.00 | 1.000 | 1.000 | 1.000 | 1.000 | 1.000 | 1.000 |
| 4 | 0.00 | 1.000 | 1.000 | 1.000 | 1.000 | 1.000 | 1.000 |
| 5 | 0.00 | 1.000 | 1.000 | 1.000 | 1.000 | 1.000 | 1.000 |
| 6 | 0.00 | 1.000 | 1.000 | 1.000 | 1.000 | 1.000 | 1.000 |
| 7 | 0.22 | 1.000 | 1.000 | 1.000 | 1.000 | 1.000 | 0.508 |
| 8 | 1.44 | 1.000 | 1.000 | 1.000 | 1.000 | 0.510 | 0.129 |
| 9 | 3.88 | 1.000 | 1.000 | 1.000 | 0.511 | 0.130 | 0.008 |
| 10 | 8.77 | 1.000 | 1.000 | 0.500 | 0.131 | 0.008 | 0.000 |
| 11 | 18.53 | 1.000 | 0.500 | 0.125 | 0.009 | 0.000 | 0.000 |

According to one embodiment the controller is configured to display a difference image of the modified image $100m$. The difference image includes only the suppressed or switched-off frequency bands now shown with their original amplitudes. The difference or inverse image can then be displayed upon user request alongside the frequency modified sub-image $100m$ for example in smaller window widget such as a "thumbnail". To this effect the controller generates a second window for said difference image which is then positioned either superposed on the window showing the frequency modified image $100m$ or besides said window widget. According to one embodiment the difference image widget appears in the corner regions of screen 100 when invoked. The difference image provides the user with a visual check option to still see the suppressed low frequency components to better assess the relevance of the removed large scale structures.

According to one embodiment, once the user has selected the sub image $100a$, the computed frequency modified $100m$ is shown at a user definable scale instead of the previously shown global image 100. If she wishes to choose another sub image, she simply clicks onto the screen or actuates a key stroke, the controller instructing the screen to revert to the global image instead of the currently computed modified image so the user can now select a different sub image from re-displayed global image. In one embodiment controller DZC supports a buffer where all previously computed modified images may be stored for quick retrieval. In other embodiments, once the modified image has been computed it is shown in a second window widget superimposed of the global image which is still shown in a first window widget in the background. The frequency modified image is shown in the second window widget in a pre-defined size which can be adjusted by the user to fully cover the global image in the background or to cover just portions thereof.

The proposed workflow when using above apparatus is to provide to the user the zoom adaptation functionality of controller DZC which can be invoked by GUI either by pointer tool interaction function or by actuation of "soft keys" displayed as button widgets in the GUI. The amount of local dynamic range compression can then be controlled by adjusting the parameter fp, in one embodiment by a slider bar widget optionally shown in the user interface GUI or by keystroke "up +"/"down −".

The components of the image processing system as of FIG. 1 are shown as separate modules arranged in a distributed architecture and connected in a suitable communication network. However, this is an exemplary embodiment only. According to one embodiment, controller DZC controller is implemented on the computer unit's graphic chip GP to harness the fast video computation capabilities of modern chips.

The components may be arranged as dedicated FPGAs or as hardwired standalone chips. In alternate embodiments, the components of may be resident in work station 100 running as software routines. The components may be programmed in a suitable scientific computing platform such as Matlab® or Simulink® and then translated into C++ or C routines maintained in a library and linked when called on by work station 100.

Figure 4:
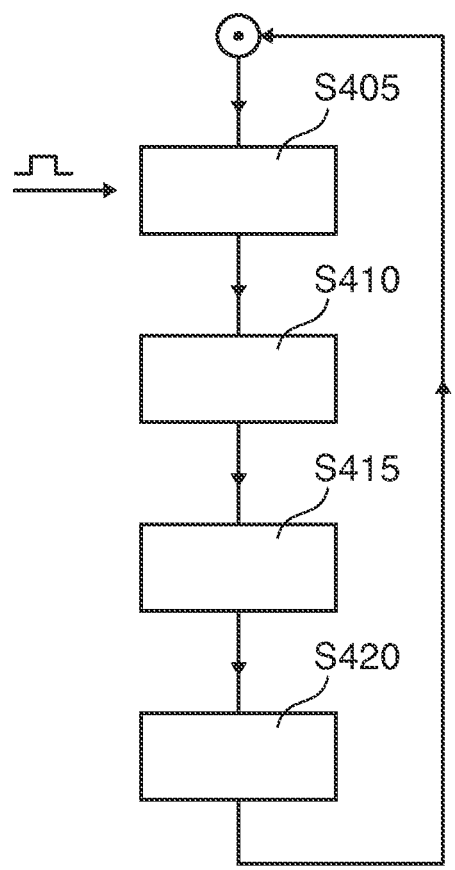
FIG. 4 is a flow chart of an image processing method.

With reference to FIG. 4 there is shown a flow chart of the method according to the present invention.

At step 405 image information is received which specifies a sub image within a global image.

At step 410 it is only in the sub image that spatial components below dynamic or pre-defined lower frequency band limit are suppressed thereby producing a spatial frequency modified image.

In step 415a the so frequency modified sub image is output for display.

At step 420 the frequency modified sub image is adapted to the grey value dynamic range of the specific monitor to be used. To this effect a histogram of the modified sub image is constructed. Pixels in the highest bin, that is those with highest brightness, are mapped to maximum brightness of the monitor whereas pixels in the lowest bin, that is lowest brightness pixels, are mapped to the lowest grey value brightness of the monitor. Pixels in bins in between those two extremes are linearly mapped to the brightness grey values on the monitors range. This way it is ensured that the highest contrast possible for the specific monitor used is harnessed to its full extent. In other words, grey values above a certain threshold are all mapped to the monitor's white value whereas pixels below a minimum threshold are all mapped to the monitor's black value. This way the contrast can be enhanced for pixels in between the two extremes because they are stretched across the palette of the monitor's grey values.

If the sub-image is updated, that is, new sub-image information is received at step S405, the steps S410-S420 are repeated using this new sub-image information.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above-described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An image processor configured for providing a user a dynamic zoom functionality, comprising:
    an input unit for receiving sub-image information specifying a spatial sub-image of a global image, the sub-image information including a pan information and/or a zoom scale;
    a suppressor configured to suppress only in the sub-image, spatial frequency components (or bands) below a dynamic lower frequency band limit thereby producing a spatial frequency modified sub-image wherein the frequency modified sub-image is produced by the suppressor upon the input unit receiving the sub-image information;

an output unit adapted to output for display on a screen the frequency modified sub-image at the specified zoom scale, the image processor thereby affording a zooming into the global image at an image portion thereof corresponding to the pan information.

2. The image processor of claim 1, the processor configured to produce an updated frequency modified sub-image upon the input unit receiving updated sub-image information, the image processor thereby capable of outputting a sequence of updated frequency modified sub-images whilst a sequence of updated sub-images is being received at the input unit.

3. The image processor of claim 1, further comprising an image generator configured to control the screen, the screen when so controlled displaying the frequency modified sub-image on the screen either along with or instead of the global image.

4. The image processor of claim 1, the processor is configured to produce on user request a difference image between the sub-image and the frequency modified sub-image, for display on the screen along with the frequency modified image, the difference image having only the suppressed spatial frequencies.

5. The image processor of claim 1, wherein the lower frequency limit is indicative of a frequency band in a Laplace image pyramid decomposition of the global image or in a Fourier decomposition or in a Wavelet decomposition.

6. The image processor of claim 1, wherein the lower frequency limit varies with a size of the sub-image as specified in the received information, said lower frequency limit the higher the smaller said sub-image size.

7. The image processor of claim 1, wherein the input unit comprises a graphical user interface responsive to a user operated input tool, in particular a pointer tool, for receiving the sub-image information as the pointer tool is operated by the user.

8. The image processor of claim 1, wherein an amount of the suppression varies with the frequency bands, the amount of suppression the higher the lower the frequency band below the lower limit frequency.

9. The image processor of claim 1, the output unit configured to map a dynamic contrast or pixel value range of the spatial frequency modified sub-image to a contrast range capability of the screen on which the spatial frequency modified sub-image is to be displayed, the mapping dependent on a brightness histogram of the spatial frequency modified sub-image.

10. An image processing system comprising the apparatus of claim 1 and a screen.

11. A computer program element for controlling an apparatus according to claim 1 which, when being executed by a processing unit, is adapted to perform the steps of:
  receiving sub-image information specifying a spatial sub-image of a global image;
  suppressing only in the sub-image, spatial frequency components (or bands) below a pre-defined lower limit frequency band thereby producing a spatial frequency modified sub-image;
  outputting for display the frequency modified sub-image at the specified zoom scale, thereby affording a zooming into the global image at an image portion thereof corresponding to the pan information.

12. A computer readable medium having stored thereon the program element of claim 11.

13. An image processing method comprising:
  receiving sub-image information specifying a spatial sub-image of a global image;
  suppressing only in the sub-image, spatial frequency components (or bands) below a pre-defined lower limit frequency band thereby producing a spatial frequency modified sub-image;
  outputting for display the frequency modified sub-image at the specified zoom scale, thereby affording a zooming into the global image at an image portion thereof corresponding to the pan information.

* * * * *